(12) United States Patent
Tu

(10) Patent No.: US 10,314,436 B2
(45) Date of Patent: Jun. 11, 2019

(54) GRINDER ATTACHMENT FOR BLENDER SYSTEM

(71) Applicant: SHARKNINJA OPERATING LLC, Newton, MA (US)

(72) Inventor: Joyce Chien Tu, Arlington, MA (US)

(73) Assignee: Sharkninja Operating LLC, Needham, MA (US)

( * ) Notice: Subject to any disclaimer, the term of this patent is extended or adjusted under 35 U.S.C. 154(b) by 157 days.

(21) Appl. No.: 14/724,356

(22) Filed: May 28, 2015

(65) Prior Publication Data
US 2016/0345779 A1    Dec. 1, 2016

(51) Int. Cl.
A47J 43/00 (2006.01)
A47J 43/046 (2006.01)
A47J 43/06 (2006.01)
A47J 43/07 (2006.01)

(52) U.S. Cl.
CPC .............. *A47J 43/046* (2013.01); *A47J 43/06* (2013.01); *A47J 43/0727* (2013.01)

(58) Field of Classification Search
CPC ....... A47J 43/046; A47J 43/06; A47J 43/0727
USPC .......................................... 241/282.1–282.2
See application file for complete search history.

(56) References Cited

U.S. PATENT DOCUMENTS

| | | | | |
|---|---|---|---|---|
| 2,530,455 | A * | 11/1950 | Forss ..................... | A47J 43/046 241/282.1 |
| 3,220,450 | A * | 11/1965 | Aronson, II ............ | A47J 43/04 241/199.12 |
| D241,404 | S | 9/1976 | Mantelet | |
| 4,081,144 | A | 3/1978 | Bouillet | |
| 4,577,975 | A * | 3/1986 | McCrory .............. | A47J 43/046 277/423 |
| D301,824 | S | 6/1989 | Machuron | |
| D318,398 | S | 7/1991 | Disco | |
| D343,987 | S | 2/1994 | Rotte | |
| D404,606 | S | 1/1999 | Huang | |
| D406,154 | S | 2/1999 | Copland et al. | |
| D410,816 | S | 6/1999 | Crescenzi et al. | |
| D426,423 | S | 6/2000 | Lee | |
| D428,301 | S | 7/2000 | Huang | |
| 6,609,821 | B2 * | 8/2003 | Wulf ..................... | A47J 43/042 318/256 |

(Continued)

FOREIGN PATENT DOCUMENTS

| | | |
|---|---|---|
| EP | 1586259 A1 | 10/2005 |
| EP | 2368470 A1 | 9/2011 |
| WO | WO 9220269 A1 * 11/1992 | ............ A47J 43/046 |
| WO | 2005013787 A1 | 2/2005 |

OTHER PUBLICATIONS

Optima—Blenders; URL Accessed: http://optimahome.net/appliances/; Date Accessed: May 26, 2016; 1 Page.

(Continued)

*Primary Examiner* — Faye Francis
(74) *Attorney, Agent, or Firm* — Cantor Colburn LLP (57) ABSTRACT

A grinder attachment for a food processing system is provided including a grinder base and a grinder cup defining a grinder chamber and a grinder opening. The grinder cup is mounted to the grinder base at a closed end of the grinder cup. The closed end is opposite the grinder opening. A rotatable blade assembly includes at least one blade positioned within the chamber of the grinder cup.

16 Claims, 6 Drawing Sheets

(56) References Cited

U.S. PATENT DOCUMENTS

| | | | |
|---|---|---|---|
| D494,192 S | 8/2004 | Hirakawa et al. | |
| D507,578 S | 7/2005 | Hirakawa et al. | |
| 7,044,051 B2 | 5/2006 | Le Rouzic | |
| 7,063,009 B2 | 6/2006 | Lin | |
| 7,066,640 B2* | 6/2006 | Sands | A47J 19/027 366/205 |
| D545,126 S | 6/2007 | White | |
| 7,249,879 B2* | 7/2007 | Nabilsi | A47J 43/046 222/235 |
| 7,278,779 B2* | 10/2007 | Beesley | A47J 43/06 366/192 |
| 7,318,666 B1 | 1/2008 | Lin | |
| D580,986 S | 11/2008 | Farnworth et al. | |
| 7,520,659 B2* | 4/2009 | Wulf | A47J 43/042 366/198 |
| 7,632,007 B2* | 12/2009 | Wulf | A47J 43/042 318/280 |
| 7,717,613 B1* | 5/2010 | Epps | A47J 43/042 366/205 |
| 7,993,054 B2* | 8/2011 | Wulf | A47J 43/042 366/205 |
| D649,834 S | 12/2011 | Sands | |
| 8,087,603 B2 | 1/2012 | Kolar et al. | |
| D655,981 S | 3/2012 | Gursel et al. | |
| 8,387,520 B2 | 3/2013 | Backus | |
| 8,469,586 B2* | 6/2013 | Schleinzer | A47J 43/044 366/202 |
| D692,275 S | 10/2013 | Audette | |
| D696,063 S | 12/2013 | Coakley et al. | |
| 8,834,015 B2* | 9/2014 | White | A47J 43/046 241/282.2 |
| D730,681 S | 6/2015 | Smith et al. | |
| D731,850 S | 6/2015 | Smith | |
| 9,084,508 B2 | 7/2015 | Sandford et al. | |
| D741,119 S | 10/2015 | Wong | |
| D743,202 S | 11/2015 | Sands | |
| D760,331 S | 6/2016 | Gilchrist et al. | |
| D767,327 S | 9/2016 | McConnell et al. | |
| D783,353 S | 4/2017 | Smith | |
| D786,614 S | 5/2017 | Smith et al. | |
| D787,883 S | 5/2017 | Tu | |
| 9,675,212 B2 | 6/2017 | Hewitt et al. | |
| D808,718 S | 1/2018 | Coakley | |
| D808,719 S | 1/2018 | Coakley | |
| D809,333 S | 2/2018 | Lee | |
| D809,334 S | 2/2018 | Lee | |
| D809,342 S | 2/2018 | Coakley | |
| D811,804 S | 3/2018 | Smith | |
| D811,805 S | 3/2018 | Smith | |
| D811,806 S | 3/2018 | Bock | |
| D812,963 S | 3/2018 | Smith | |
| D812,964 S | 3/2018 | Tu | |
| D813,603 S | 3/2018 | Tu | |
| 2013/0074701 A1* | 3/2013 | Zhao | A47J 43/046 99/348 |
| 2017/0208998 A1* | 7/2017 | Dickson, Jr. | A47J 43/046 |

OTHER PUBLICATIONS

Application for Registration of an Industrial Design Examiner's Report; Canadian Application No. 165376; dated Feb. 18, 2016; 3 Pages.

International Search Report; International Application No. PCT/US2016/034555; International Filing Date: May 27, 2016; dated Aug. 17, 2016; 7 Pages.

JPO Publicly Known Design No. HA24003661—Croissant, No. 11, vol. 36, May 25, 2012, 3 Pages.

JPO Publicly Known Design No. HJ22059623—Cuisinart SG-10 Electric Spice-and-Nut Grinder (Certified Refurbished), Amazon. Com, Date Printed: Nov. 14, 2016, 1 Page.

Notice of Allowance; Japanese Application No. 2015-026735; dated Mar. 4, 2016; 2 Pages.

Notice of Allowance; Japanese Application No. 2015-026737; dated Mar. 4, 2016; 2 Pages.

Notice of Allowance; Japanese Application No. 2015-026738; dated Mar. 4, 2016; 2 Pages.

Notice of Allowance; U.S. Appl. No. 29/528,395, filed May 28, 2015; Blender Attachment; dated Jan. 20, 2017; 12 Pages.

Notice of Completion of Formalities for Patent Register; Chinese Application No. 2015304854707; dated Mar. 23, 2016; 4 Pages.

Notice of Completion of Formalities for Patent Register; Chinese Application No. 2015304861132; dated Mar. 18, 2016; 3 Pages.

Notice of Decision for Design Registration; Korean Application No. 30-2015-0059376_M001; dated Jun. 29, 2016; 6 Pages.

Notice of Decision for Design Registration; Korean Application No. 30-2015-0059376_M002; dated Jun. 29, 2016; 6 Pages.

Notice of Decision for Design Registration; Korean Application No. 30-2015-0059376_M003; dated Jun. 29, 2016; 6 Pages.

Notice of References; Japanese Application No. 2015-026735; Date of Mailing: Mar. 4, 2016; 2 Pages.

Notice of References; Japanese Application No. 2015-026738; Date of Mailing: Mar. 4, 2016; 2 Pages.

Notification of Reasons for Rejection; Japanese Application No. 2015-026736; dated Mar. 4, 2016; 4 Pages.

Office Action; Korean Application No. 30-2015-0059376_M001; dated Mar. 23, 2016; 4 Pages.

Office Action; Korean Application No. 30-2015-0059376_M002; dated Mar. 23, 2016; 5 Pages.

Office Action; Korean Application No. 30-2015-0059376_M003; dated Mar. 23, 2016; 5 Pages.

Office Action; Korean Application No. 30-2015-0059376_M004; dated Mar. 23, 2016; 5 Pages.

Requirement for Restriction/Election; U.S. Appl. No. 29/528,395, filed May 28, 2015; Blender Attachment; dated Sep. 13, 2016; 7 Pages.

Written Opinion of the International Searching Authority; International Application No. PCT/US2016/034555; International Filing Date: May 27, 2016; dated Aug. 17, 2016; 6 Pages.

Notice of Decision for Design Registration; Korean Application No. 30-2015-0059376_M004; dated Jun. 29, 2016; 6 Pages.

Notice of Allowance; U.S. Appl. No. 29/528,395, filed May 28, 2015; Blender Attachment; dated Nov. 23, 2016; 7 Pages.

Requirement for Restriction/Election; U.S. Appl. No. 29/601,246, filed Apr. 20, 2017; Blender Attachment; dated Jul. 6, 2017; 15 Pages.

PCT International Preliminary Report on Patentability; International Application No. PCT/US2016/034555; International Filing Date: May 27, 2016, dated Nov. 28, 2017, pp. 1-7.

Notice of Allowance; U.S. Appl. No. 29/601,246, filed Apr. 20, 2017; Blender Attachment; Notification Date: Oct. 17, 2017; 16 Pages.

Requirement for Restriction/Election; U.S. Appl. No. 23/633,938; filed Jan. 17, 2018; Blender Attachment; Notification Date: Sep. 19, 2018; 16 Pages.

* cited by examiner

GRINDER ATTACHMENT FOR BLENDER SYSTEM

BACKGROUND

This application is directed to a food processor, and more particularly, to a grinder attachment for use with a food processor.

Food processors, such as blenders are commonly used to process a plurality of different food products, including liquids, solids, semi-solids, gels and the like. It is well-known that blenders are useful devices for blending, cutting, and dicing food products in a wide variety of commercial settings, including home kitchen use, professional restaurant or food services use, and large-scale industrial use. They offer a convenient alternative to chopping or dicing by hand, and often come with a range of operational settings and modes adapted to provide specific types or amounts of food processing, e.g., as catered to particular food products.

SUMMARY

According to one embodiment, a grinder attachment for a food processing system is provided including a grinder base and a grinder cup defining a grinder chamber and a grinder opening. The grinder cup is mounted to the grinder base at a closed end of the grinder cup. The closed end is opposite the grinder opening. A rotatable blade assembly includes at least one blade positioned within the chamber of the grinder cup.

According to another embodiment, a food processing system is provided including a food processor having a rotary component. A grinder attachment is configured for removable associate with the food processor. The grinder attachment includes a grinder cup defining a grinder chamber that opens at a distal end of the grinder cup relative to the food processor. A rotatable blade assembly includes a rotary coupling and at least one blade. The at least one blade is positioned within the chamber of the grinder cup. The coupling being associable with the rotary component of the food processor.

BRIEF DESCRIPTION OF THE FIGURES

The accompanying drawings incorporated in and forming a part of the specification embodies several aspects of the present invention and, together with the description, serves to explain the principles of the invention. In the drawings.

The detailed description explains embodiments of the invention, together with advantages and features, by way of example with reference to the drawings.

DETAILED DESCRIPTION

Figure 1:
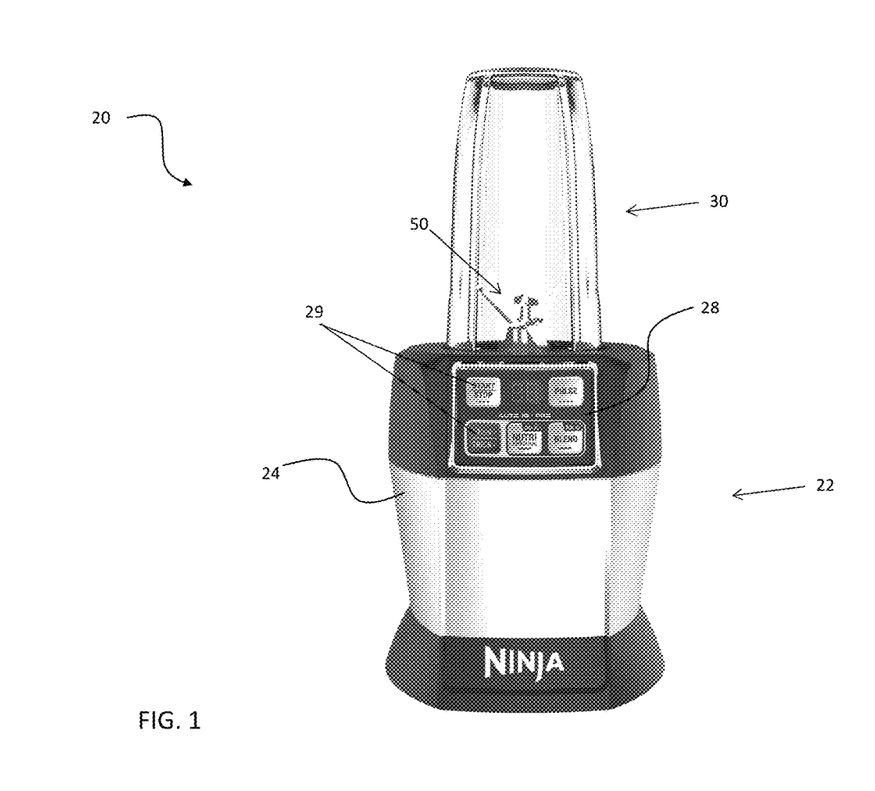
FIG. 1 is a perspective view of an example of a food processing system.
Figure 2:
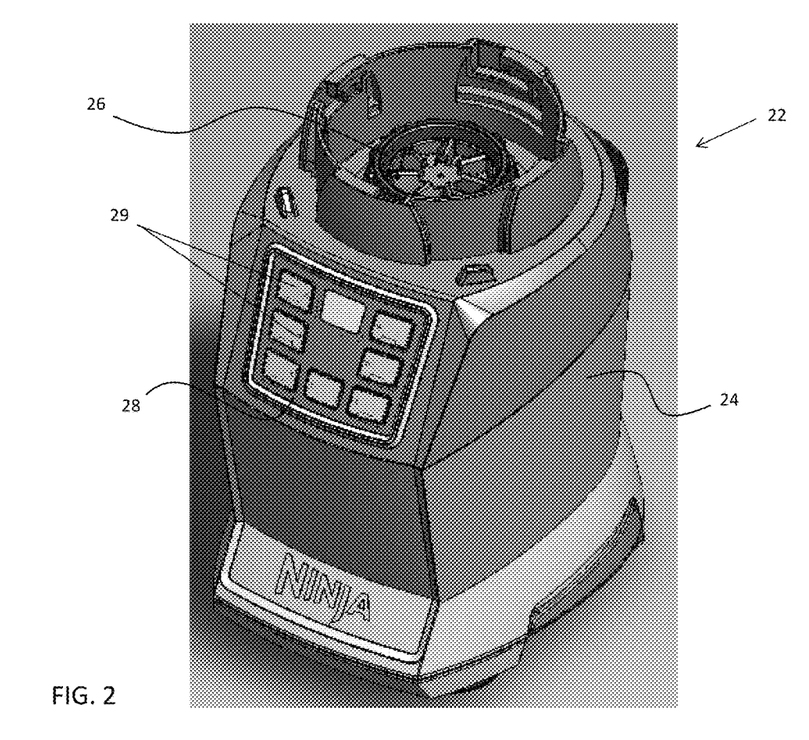
FIG. 2 is a perspective view of a base of a food processing system.
Figure 3:
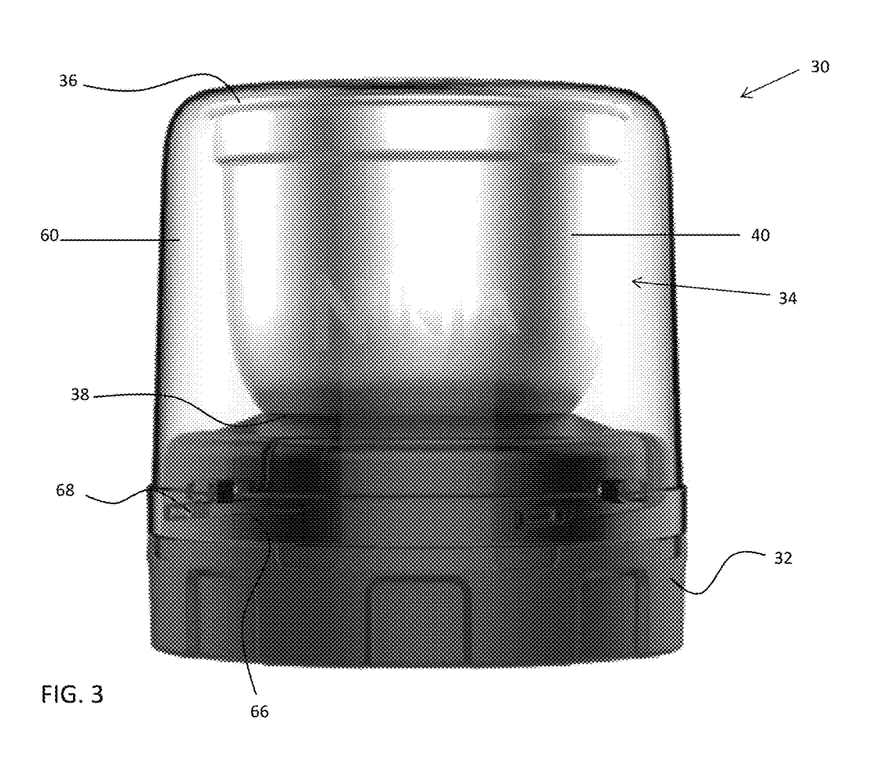
FIG. 3 is a front view of a grinder attachment configured for use with the food processing system according to an embodiment of the invention.
Figure 4:
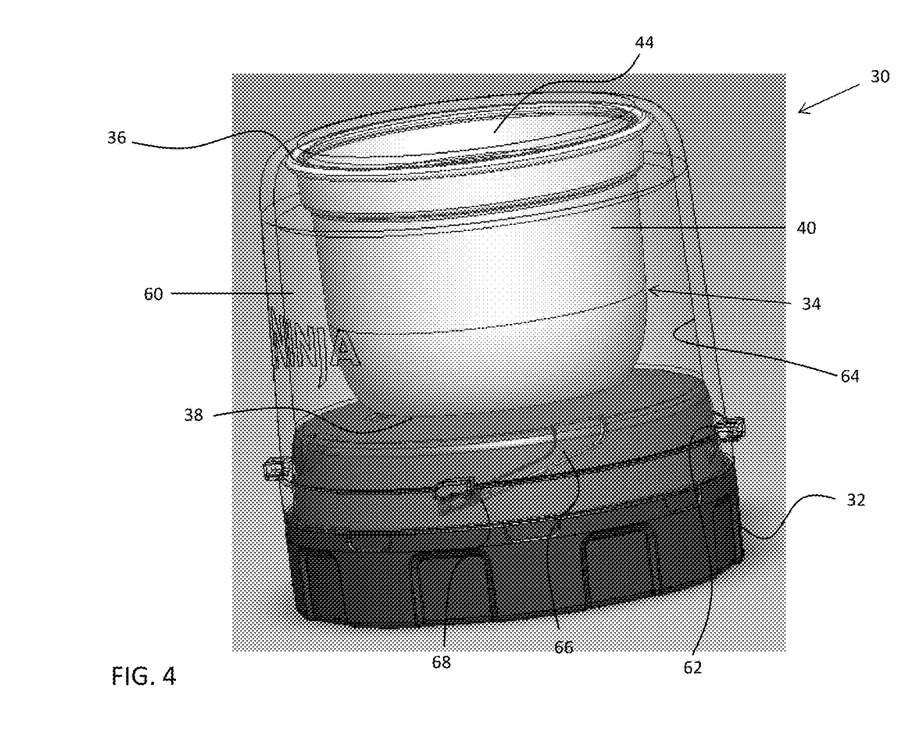
FIG. 4 is a perspective view of a grinder attachment configured for use with the food processing system according to an embodiment of the invention.
Figure 5:
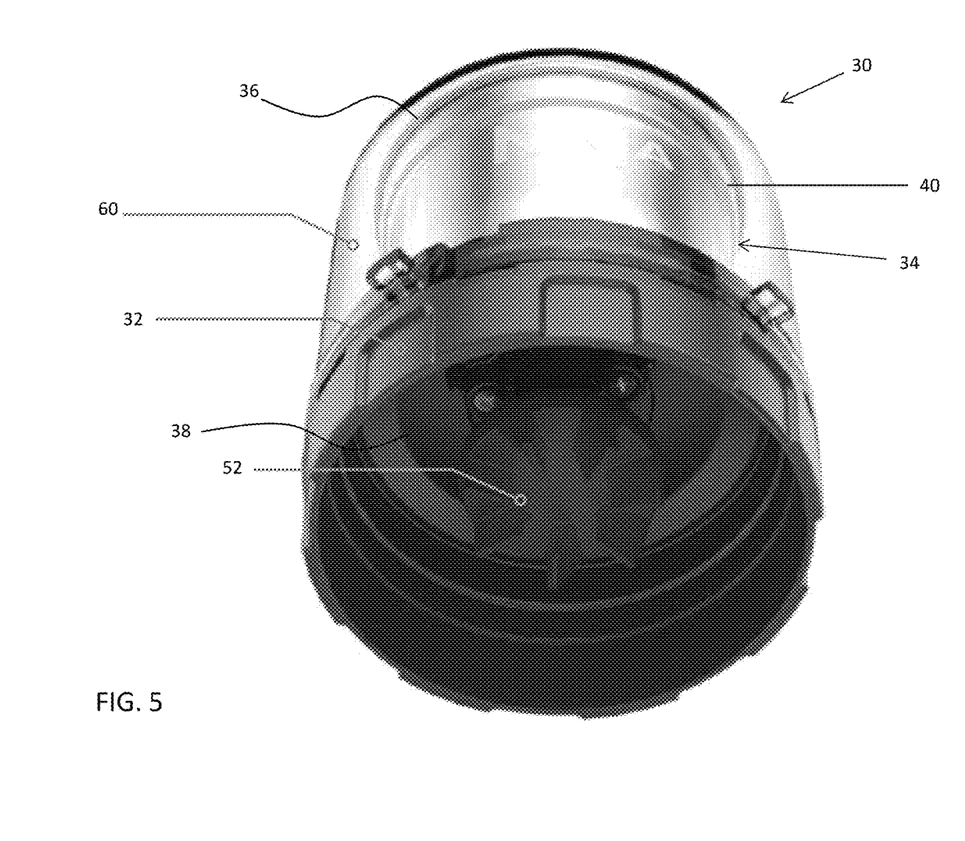
FIG. 5 is a bottom perspective view of a grinder attachment configured for use with the food processing system according to an embodiment of the invention.

Referring now to the FIG. 1, an example of a multi-functional food processing system 20 is illustrated in more detail. In general, the food processing system 20 can be adapted to perform any food processing or blending operation including as non-limiting examples, dicing, chopping, cutting, slicing, mixing, blending, stirring, crushing, or the like. Although the food processing system illustrated and described herein is a personal blender system, other food processing systems are within the scope of the present disclosure. The food processing 20 system includes a base 22 having a body or housing 24 within which a motorized unit (not shown) and at least one controller (not shown) are located. The base 22 includes at least one rotary component, such as a drive coupler 26 (see FIG. 2) for example, driven by the motorized unit within the body 24. The base 22 additionally includes a control panel or user interface 28 with options for turning the motorized unit on and off and for selecting various modes of operation, such as pulsing, blending, or continuous food processing. The at least one drive coupler 26 is configured to engage a portion of an attachment 30 coupled to the base 22 for the processing of food products located within an interior of the attachment 30. This will become more apparent in subsequent FIGS. and discussion.

Figure 6:
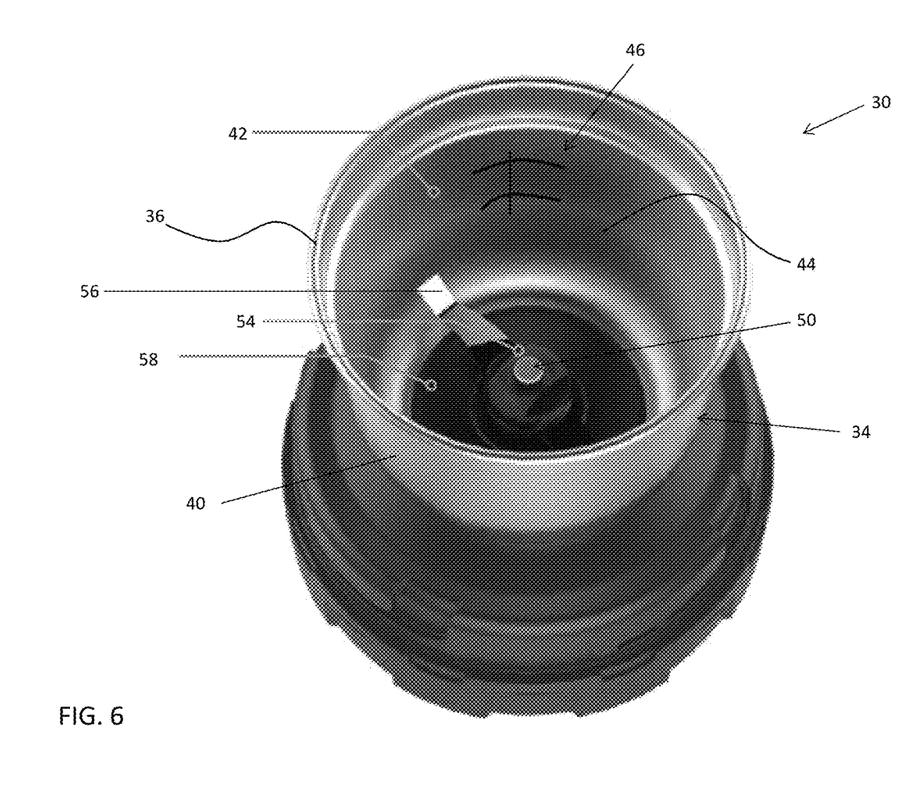
FIG. 6 is a top perspective view the grinder attachment of FIGS. 3-5 without a cover according to an embodiment of the invention.

A plurality of interchangeable attachments 30 varying in size and/or functionality may be configured for use with the base 22. For example, in FIG. 1, the attachment 30 connected to the food processor base 22 is a generally hollow container. In the non-limiting embodiment illustrated in FIGS. 3-6, the attachment 30 is a grinder, such as for grinding spices or coffee for example. The grinder attachment 30 includes a grinder base 32 having a grinder cup 34 installed thereon. The grinder cup 34 may, but need not be formed from a metal material, such as stainless steel for example. The grinder cup 34 generally includes a top 36, a bottom 38 and one or more walls 40 extending there between to define an interior chamber 42 within which food products are placed. As best shown in FIG. 6, the top 36 of the grinder cup 34 includes an opening 44 that provides access for the one or more food items into the chamber 42. The bottom 38 is generally closed, such as by contact with the grinder base 32 for example, such that food products contained within the chamber 44 are unable to escape through the bottom 38. In one embodiment, one or more markings are formed in wall 40 within the chamber 42 to identify to a user various volumes.

The grinder attachment 30 further includes a rotatable blade assembly 50 to facilitate the processing and/or blending of the food products located therein. As shown, the rotatable blade assembly 50 includes a coupling 52, complementary to the at least one drive coupler 26 of the base 22, disposed at the underside of the grinder base 32 (FIG. 6). A spindle 54 is attached to the coupling 52 and extends through the grinder base 32 and the bottom 38 of the grinder cup 34. The spindle 54 is configured to rotate about an axis A and has at least one blade 56 mounted thereto. The at least one blade 56 is disposed within the chamber 42 of the grinder cup 34 such that rotation thereof about axis A is adapted to facilitate processing and/or blending of the food products arranged therein. In one embodiment, a mounting disc 58 (FIG. 6) is positioned within the chamber 42 adjacent the bottom 38 of the grinder cup 34 to form a seal therein.

A cover 60 configured to surround the grinder cup 34 is removably coupled to the grinder base 32 to prevent movement of one or more food items from the chamber 42. In the illustrated, non-limiting embodiment, the cover 60 is formed from a durable, transparent material, for example plastic, to allow a user to determine whether the food products within the chamber 42 of the grinder cup 34 are sufficiently processed. As shown in the FIGS., the cover 60 may be formed with a plurality of tabs 62 protruding inwardly from a surface 64 of the cover 60. To install the cover 60 onto the grinder base 32, each of the plurality of tabs 62 engages a complementary pathway 66 formed in the grinder base 32. In one embodiment, the pathways 66 extend about a portion of the circumference of the grinder base 32 such that the cover 60 is configured to rotate relative to the grinder base 32. In one embodiment, an obstruction 68 is formed within a portion of the pathway 66 to prevent unintended rotation of the cover 60 relative to the grinder base 32. Although a specific connection between the cover 60 and the grinder base 32 is illustrated and described herein, other types of connections are within the scope of the disclosure.

The grinder attachment 30, and possibly any of the other attachments configured for use with the base 22, may be configured to slidably connect thereto. Alternatively or in addition, the attachment 30 may be configured to rotatably connect to the base 22 such that the attachment 30 is locked relative to the base 22. In one embodiment, a plurality of tabs 70 extending outwardly from the cover 60 are configured to align with a plurality of complementary openings formed in the base 22. Rotation of the attachment 30 causes the tabs 70 to engage adjacent channels, thereby preventing unintended separation of the attachment 30 from the base 22 during operation of the food processing system 20.

When the attachment 30 is mounted to the base 22, at least a portion of the grinder base 32 is received within the base 22. The coupling 52 of the grinder attachment 30 is positioned adjacent to and in contact with the at least one drive coupler 26 of the base 22 such that the motorized unit and the rotatable blade assembly 50 within the attachment are mechanically coupled. As a result, the motorized unit can be adapted to drive rotation of the rotatable blade assembly 50 about axis A to perform one or more food processing and/or blending operations when one or more buttons 29 of a user interface 28 on the base 22 are actuated.

The grinding attachment 30 disclosed herein expands on the functionality of a food processing system. As a result, the need for a separate grinding apparatus, for example to grind coffee, spices, and other foods, is eliminated.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A grinder attachment of a food processing system, the grinder attachment comprising:
   a grinder base;
   a grinder cup defining a grinder chamber and a grinder opening, said grinder cup being mounted to said grinder base at a closed end of said grinder cup, said closed end being opposite said grinder opening;
   a rotatable blade assembly including at least one blade positioned within the chamber of the grinder cup; and
   a cover for sealing said grinder opening, wherein said cover is configured to couple to said grinder base;
   wherein said grinder base is receivable within a base of the food processing system, and when said grinder base is connected to said base of the food processing system, said base of the food processing system is operable to drive the rotatable blade assembly of the grinder attachment about an axis of rotation.

2. The grinder attachment according to claim 1, wherein said rotatable blade assembly is driven by a said food processing system.

3. The grinder attachment according to claim 1, wherein the cover is configured to surround said grinder cup.

4. The grinder attachment according to claim 1, wherein said grinder base includes at least one pathway formed therein and said cover includes at least one protrusion receivable within said pathway.

5. The grinding attachment according to claim 1, wherein the food processing system is a personal blender system.

6. The grinder attachment according to claim 1, wherein said cover includes at least one tab configured to couple said grinder attachment to said food processing system.

7. A food processing system comprising:
   a food processor base having a rotary component; and
   a grinder attachment configured for removable association with said food processor base, said grinder attachment including:
   a grinder base connectable to the food processor base;
   a grinder cup mounted to said grinder base, said grinder cup defining a grinder chamber that opens at a distal end of said grinder cup relative to said food processor base;
   a rotatable blade assembly including a rotary coupling and at least one blade, the at least one blade being positioned within the chamber of the grinder cup, said coupling being associable with said rotary component of said food processor; and a cover for surrounding said grinder cup, wherein said cover is removably coupleable to said grinder base;

wherein when said grinder attachment is receivable within said food processor base, said food processor base is operable to drive the rotatable blade assembly of the about an axis of rotation.

8. The food processing system according to claim 7, wherein rotation of said at least one blade is driven by said rotary component.

9. The food processing system according to claim 8, wherein said rotary component is configured to engage and drive said rotary coupling of said rotatable blade assembly.

10. The food processing system according to claim 7, wherein the cover prevents food from leaving said grinder chamber when said food processing system is in use.

11. The food processing system according to claim 7, wherein at least one of said rotary coupling and said cover removably affix said grinder attachment to said food processor.

12. The food processing system according to claim 7, wherein said cover includes at least one protrusion configured to engage a portion of said food processing system to limit movement of said grinder attachment relative to said food processing system.

13. The food processing system according to claim 7, wherein said grinder cup is mounted to said grinder base at a closed end.

14. The food processing system according to claim 13, further comprising a mounting disc positioned within said grinder chamber adjacent said closed end.

15. The food processing system according to claim 7, wherein said grinder base includes at least one pathway formed therein and said cover includes at least one tab configured to engage said pathway to couple said cover to said grinder base.

16. A grinder attachment of a food processing system, the grinder attachment comprising:
a grinder base;
a grinder cup defining a grinder chamber and a grinder opening, said grinder cup being mounted to said grinder base at a closed end of said grinder cup, said closed end being opposite said grinder opening;
a rotatable blade assembly including at least one blade positioned within the grinder chamber of the grinder cup; and
a mounting disc positioned within the grinder chamber adjacent said closed end of said grinder cup said mounting disc forming a seal between the rotatable blade assembly and said grinder chamber;
wherein said grinder base is receivable within a base of the food processing system, and when said grinder base is connected to said base of the food processing system, said base of the food processing system is operable to drive the rotatable blade assembly of the grinder attachment about an axis of rotation.

* * * * *